United States Patent

[11] 3,572,613

| [72] | Inventor | Arthur Porter |
| | | 3015 River Road, Eugene, Oreg. 97402 |
| [21] | Appl. No. | 799,573 |
| [22] | Filed | Feb. 17, 1969 |
| [45] | Patented | Mar. 30, 1971 |

[54] CIRCULAR WING AIRCRAFT
6 Claims, 10 Drawing Figs.

[52] U.S. Cl. ............................................. 244/12
[51] Int. Cl. .......................................... B64c 29/00
[50] Field of Search........................... 244/12, 23, 7

[56] References Cited
UNITED STATES PATENTS

| 2,322,715 | 6/1943 | Kloeren............... | 244/7.1 |
| 3,199,809 | 8/1965 | Modesti................ | 244/12C |
| 3,312,425 | 4/1967 | Lennon et al.......... | 244/12C |
| 2,801,058 | 7/1957 | Lent...................... | 244/12 |
| 3,073,551 | 1/1963 | Bowersox.............. | 244/23 |

FOREIGN PATENTS

| 678,700 | 1/1964 | Canada................ | 244/23C |
| 1,070,544 | 7/1954 | France................. | 244/23C |

Primary Examiner—Milton Buchler
Assistant Examiner—Steven W. Weinrieb
Attorney—Oliver D. Olson ABSTRACT: A hollow, circular housing is open about its periphery and has a central opening in its top. Circumferentially spaced vanes extend between the central opening and the open periphery to direct air flow from the central opening radially outward through the open periphery and across the upper and lower surfaces of an annular airfoil wing secured to the housing. A pair of jet engines at the housing periphery operate to rotate the housing to effect said movement of air.

Patented March 30, 1971

ARTHUR PORTER
INVENTOR.

BY *Oliver O. Olson*
AGENT

Patented March 30, 1971

ARTHUR PORTER
INVENTOR.

BY Oliver D. Olson

AGENT

FIG. 7
FIG. 9  FIG. 10
FIG. 8
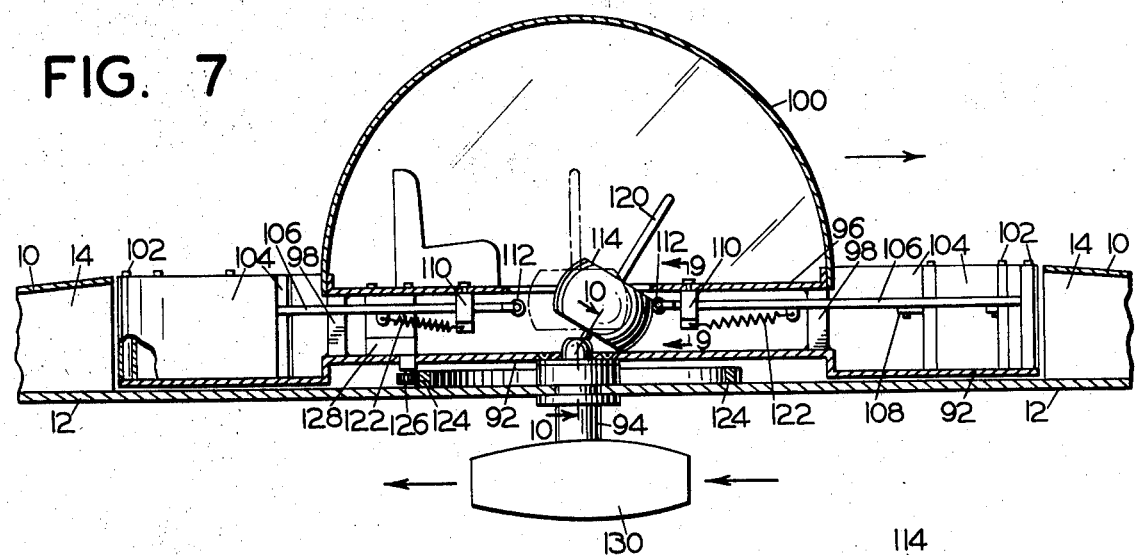
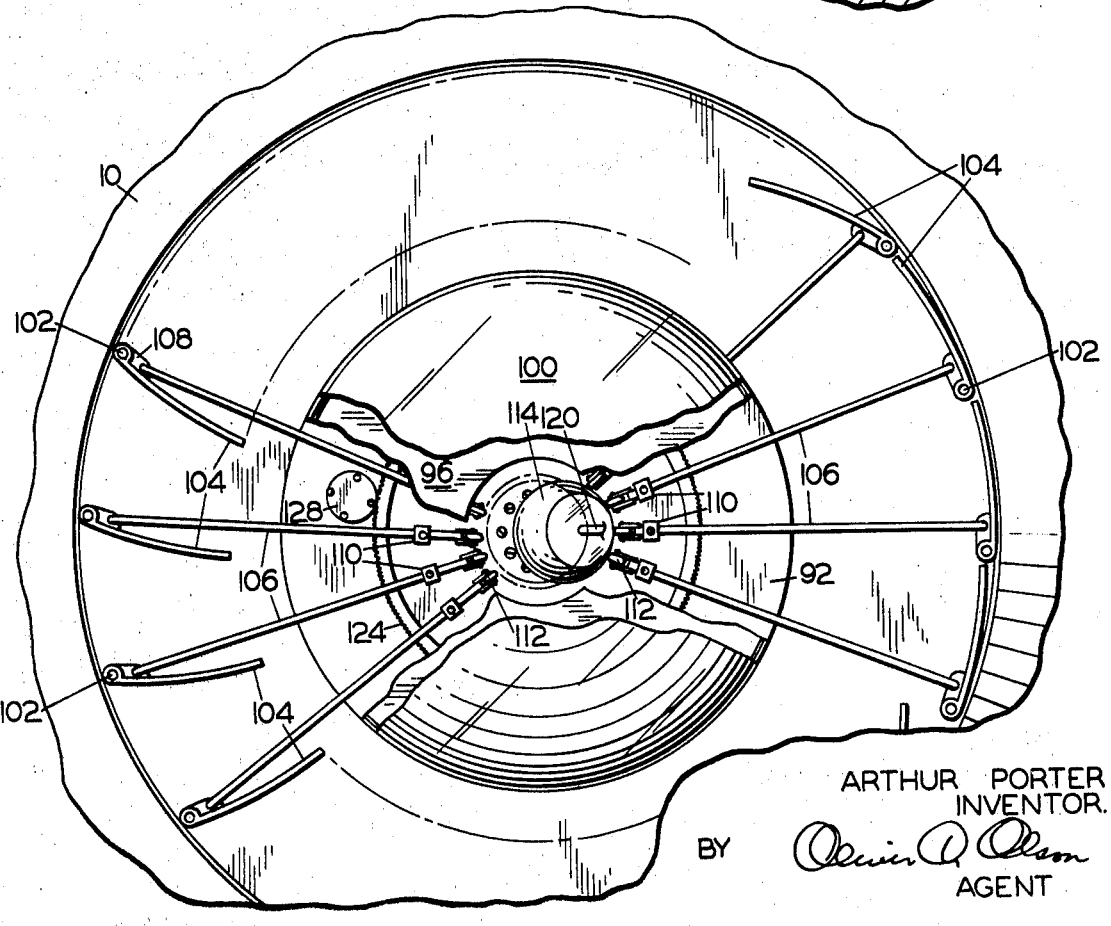
ARTHUR PORTER
INVENTOR.
BY
AGENT

CIRCULAR WING AIRCRAFT

BACKGROUND OF THE INVENTION

This invention relates to aircraft, and more particularly to a circular aircraft having an annular wing of airfoil cross section.

Circular aircraft constructions of the prior art generally are characterized by the absence of an airfoil wing, and therefore achieve vertical movement by reaction to a downwardly directed controlled stream of air or other gas, in the manner of a rocket. The power requirements for such structures render them costly to manufacture and operate. Another form of circular aircraft provides for the movement of air radially inward over an annular airfoil wing, induced by the action of a centrally located propeller which operates to provide a downwardly directed air stream. This arrangement provides inefficient movement of air radially inward over the wing and makes only a very small contribution to the lifting power of the propeller.

SUMMARY OF THE INVENTION

In its basic concept the circular wing aircraft of this invention provides for the development of an air flow from the center of its circular housing radially outward over the surfaces of a circular airfoil wing supported by the housing.

It is by virtue of the foregoing basic concept that the principal objective of the present invention is achieved, namely to overcome the disadvantages of prior circular aircraft structures and their modes of operation.

The foregoing and other objects and advantages of this invention will appear from the following detailed description, taken in connection with the accompanying drawings of the preferred embodiments.

BRIEF DESCRIPTION OF THE DRAWINGS

FIG. 7 is a fragmentary sectional view of a still further modified form of circular wing aircraft embodying the features of this invention.

FIG. 8 is a fragmentary plan view as viewed from the top in FIG. 7, parts being broken away to disclose details of internal construction.

FIG. 9 is a fragmentary sectional view taken on the line 9-9 in FIG. 7.

FIG. 10 is a fragmentary sectional view taken on the line 10-10 in FIG. 7.

DESCRIPTION OF THE PREFERRED EMBODIMENTS

Figure 1:
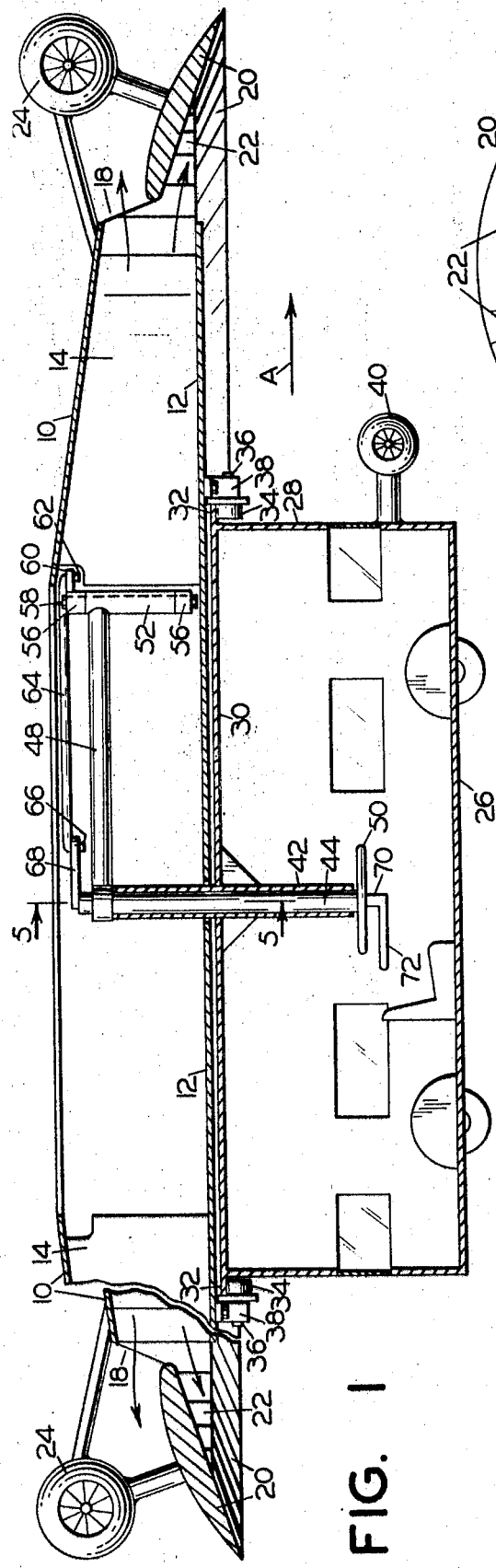
FIG. 1 is a foreshortened sectional view through the center of a circular wing aircraft embodying the features of the present invention.
Figure 2:
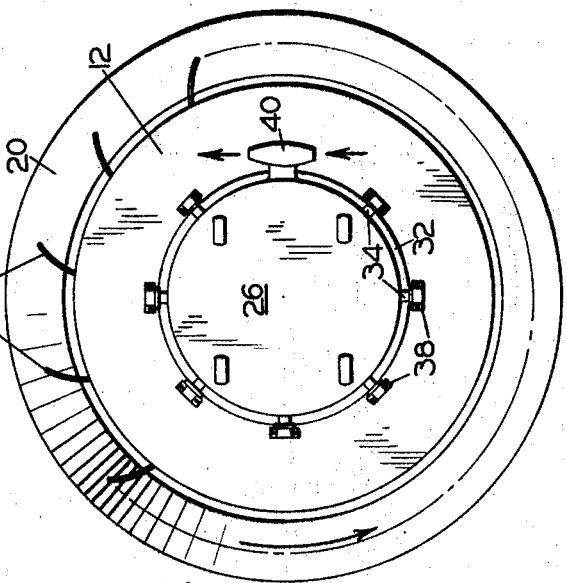
FIG. 2 is a bottom plan view of the aircraft illustrated in FIG. 1.

Referring first to FIGS. 1-5, the circular wing aircraft illustrated therein includes a circular housing defined by the top wall 10 and bottom wall 12. These walls are supported in spaced apart relation by means of a plurality of circumferentially spaced vanes 14. The top wall has an enlarged central opening 16 which defines an air inlet, and the spaced apart outer margins of the top and bottom walls define a peripheral air outlet 18 about the housing.

An annular wing member 20 of airfoil cross section is mounted on the housing in concentric relation therewith. In the embodiment illustrated the wing is positioned outwardly of and adjacent the peripheral air outlet opening 18 of the housing and is supported by outward extensions 22 of the vanes. The angular inclination of the wing member is chosen to provide the aircraft with optimum lift characteristics.

Means is provided for generating a flow of air inward through the central air inlet opening 16 and thence radially outward through the peripheral air outlet opening 18 and across the upper and lower surfaces of the wing member. In the embodiment illustrated, such air flow generating means is provided by a pair of aircraft engines 24 disposed diametrically opposite each other adjacent the outer periphery of the housing. The engines illustrated are of the jet type, and each is supported by struts projecting from the housing top wall and wing member, respectively. Propeller type engines may be used in place of the jet engines, if desired.

Figure 3:
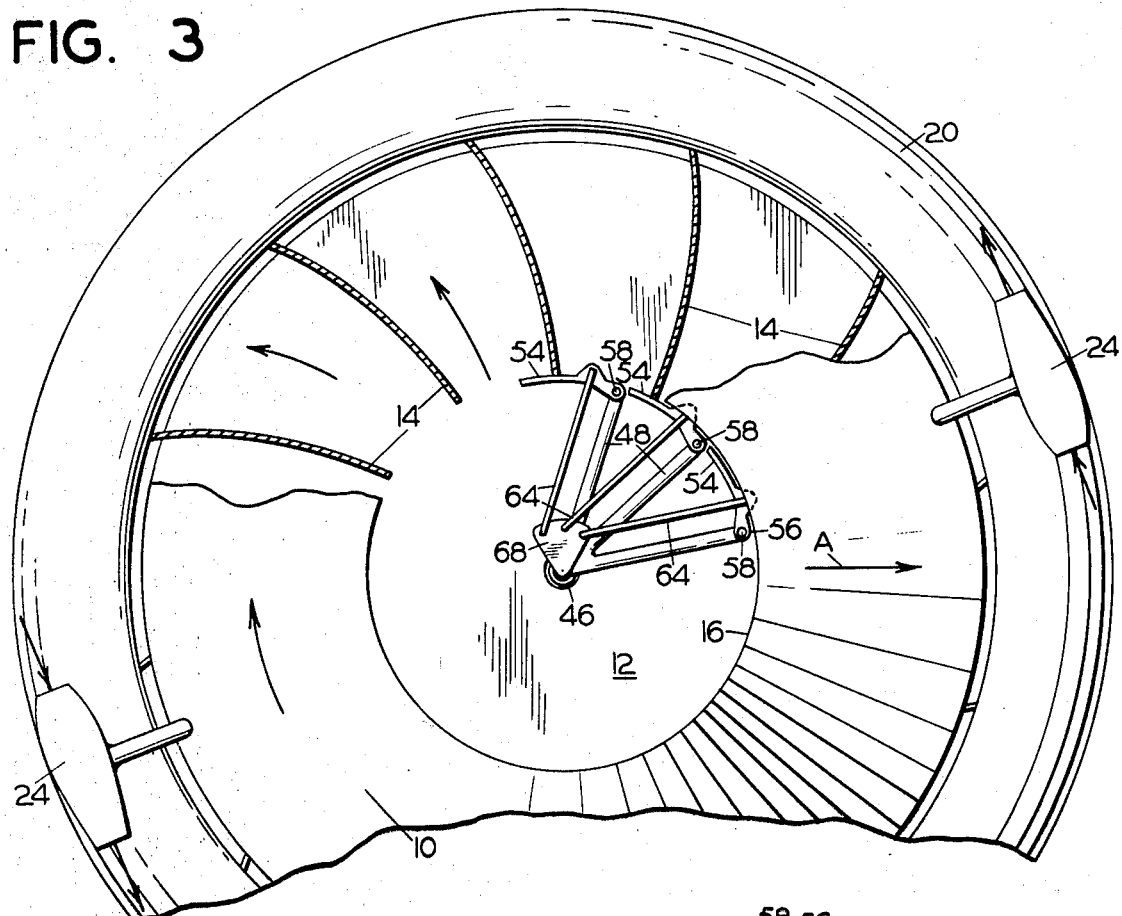
FIG. 3 is a fragmentary top plan view of the aircraft illustrated in FIG. 1, parts being broken away to disclose details of internal construction.
Figure 5:
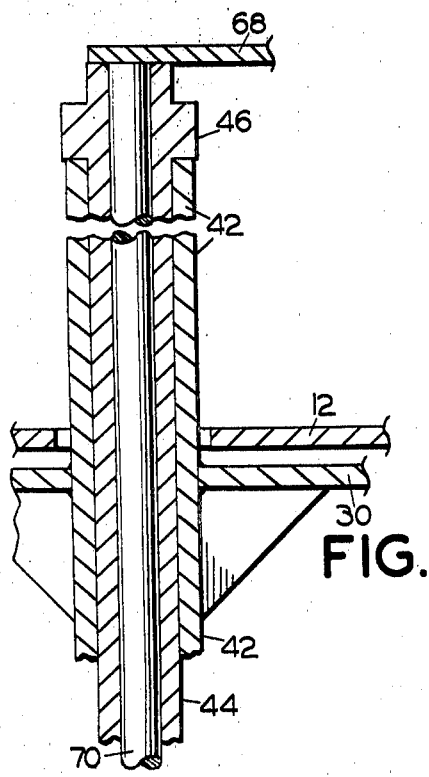
FIG. 5 is a foreshortened, fragmentary sectional view taken on the line 5-5 in FIG. 1.
Figure 4:
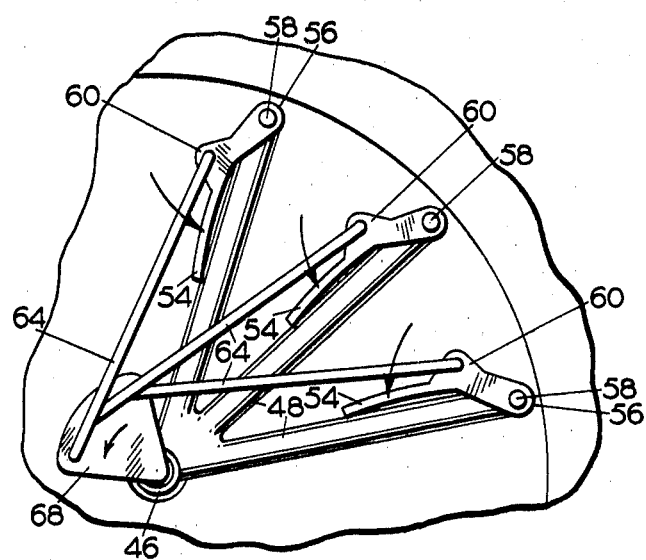
FIG. 4 is a fragmentary plan view of a central portion of FIG. 3 showing the baffles in open position.

The aircraft engines are arranged to provide thrust in the same direction of rotation about the axial center of the housing (FIG. 3), whereby to effect axial rotation of the housing and wing member. In FIG. 3 this direction of rotation is indicated by an arrow as being clockwise, induced by the counterclockwise thrust of the engines.

Accordingly, as the housing is caused to rotate, centrifugal force causes air to be drawn inward through the central air inlet opening 16 and ejected outward through the peripheral air outlet opening 18. This air is forced to pass outward over the upper and lower surfaces of the wing member 20, whereby to effect lift in the same manner as a conventional winged aircraft.

Although the vanes 14 may be omitted, by providing other spacing supports between the top and bottom walls of the housing, the provision of the vanes is preferred since they provide circumferentially spaced passageways for the controlled flow of air, as described in detail hereinafter. The vanes may be straight, and extend radially between the air inlet and outlet openings. However, it is preferred that the vanes radiate arcuately outward in the trailing direction of rotation of the housing, as illustrated, to enhance the centrifugal action of the rotating housing.

In the alternative, the air flow generating means may comprise a single propeller or jet type aircraft engine mounted centrally above the air inlet opening 16, or a plurality of such engines mounted symmetrically about the air inlet opening, and arranged to cause air to be forced downward through the air inlet opening and thence radially outward through the peripheral air outlet opening. With such an arrangement the housing and wing member need not rotate.

In the embodiment illustrated in FIGS. 1-5 an operator's compartment is positioned under the hollow housing and is supported for rotation relative to the housing. The compartment comprises a bottom wall 26, an upstanding peripheral wall 28 and a top wall 30. Depending upon the overall size of the aircraft, the compartment may be of sufficient size to accommodate passengers and/or cargo, in addition to the operator. A circular flange 32 projecting outward from the top wall 30 overlies and rests upon a plurality of circumferentially spaced rollers 34 mounted on shafts 36 journaled in bearings 38 secured to the bottom wall 12 of the housing. The latter thus may rotate, as required, while allowing the compartment to be maintained stationary or its rotation controlled.

Means for preventing or controlling rotation of the compartment relative to the housing is provided, in the embodiment illustrated, by an aircraft engine 40 projecting outward from the compartment. This engine may be of the propeller or jet type and is arranged to provide a thrust in the direction opposing rotation of the compartment in the same direction as the housing. The tendency of the compartment to rotate with the housing is governed primarily by the frictional interengagement of the supporting rollers 34 and flange 32. Accordingly, the size of the engine may be quite small, since it need be capable merely of counteracting the effect of such friction.

Means is included in the embodiment illustrated in FIGS. 1-5, for providing steerage and horizontal movement of the aircraft. A sleeve 42 is secured to the top supporting wall 30 of the compartment and extends vertically through an opening in the bottom wall 12 of the housing, on the axial center of the latter. A hollow shaft 44 extends rotatably through the sleeve, and an enlarged shoulder 46 at the upper end of the shaft supports at least one radial arm 48 which terminates adjacent the inner end of the vanes 14. In the embodiment illustrated there are three such radial arms. The arms are rotatable with the shaft 44 by means of the operating wheel 50 secured to the lower end of the shaft.

The outer end of each radial arm supports a bearing 52 provided with a vertically extending bore. A baffle member 54 is supported pivotally on the bearing by means of the projecting ears 56 which receive the bearing between them. Openings in the ears register with the bearing bore to receive the connecting pivot shaft 58. The baffle member is dimensioned to correspond substantially with the dimensions of the inlet end of each passageway defined by adjacent vanes 14. Thus, when each baffle member is rotated to its extended position illustrated in FIG. 3, it is capable effectively of closing the inlet end of each passageway, one at a time during rotation of the housing. The three baffle members illustrated are capable effectively of closing the inlet ends of three such passageways, as will be understood.

Means is provided for moving the baffle members 54 between said extended position and a retracted position (FIG. 4) opening the inlet ends of the passageways. In the embodiment illustrated, each baffle member is provided at its upper edge with a flange 60 apertured vertically to pivotally receive the pivot pin 62 at one end of the link member 64. The pivot pin 66 at the opposite end of the link member is received in an opening in the cam plate 68 secured to the upper end of the elongated control shaft 70. This shaft extends rotatably through the hollow shaft 44 and terminates at its lower end within the compartment. An operating lever 72 is secured to the lower end of the control shaft.

In operation, let it be assumed that the aircraft is resting upon the ground and that it is desired first to lift the aircraft vertically. The operator manipulates the lever 72 to move the baffle members 54 to their open position illustrated in FIG. 4, and then activates the aircraft engines 24 to effect rotation of the housing and wing member. As rotational speed increases, the velocity of air ejected radially outward over the entire upper and lower surfaces of the annular wing member reaches a magnitude at which the differential pressure across the wing member is sufficient to lift the aircraft from the ground.

It will be understood that the stabilizer engine 40 also is energized and adjusted to prevent rotation of the compartment.

Assume, now, that the operator desires to have the aircraft move horizontally toward the right in the direction of arrow A in FIGS. 1 and 3. The wheel 50 is manipulated to rotate the arms 48 to position the baffle members 54 forward of the supporting sleeve 42 with respect to the direction of desired horizontal movement of the aircraft and symmetrical with respect to a line extending through the axis of the sleeve in the desired direction of horizontal movement, e.g. arrow A. The lever 72 then is rotated to move the baffle members from the open position illustrated in FIG. 4 to the closed position illustrated in FIG. 3. Since the flow of air through the vent-defining passageways is blocked as the passageways rotate through the arc of the closed baffle members, no lifting force is provided for the wing member 20 in that area. Accordingly, that area of the rotating wing at the right in FIG. 1 tends to drop downward, inclining the aircraft in a downward direction toward the right. In this position of incline the rotating annular wing member functions to move the aircraft toward the right, in manner similar to horizontal movement afforded a helicopter by angling the pitch of the rotor shaft.

If the operator then wishes to make a turn toward the left with the aircraft moving horizontally toward the right in FIGS. 1 and 3, the wheel 50 is rotated to move the closed baffles toward the left from their previously set position, for example to the position illustrated in FIG. 3. This shifts the arcuate segment of no lift toward the left, causing the aircraft to tilt downward toward the left and turn in that direction. The magnitude of the turn is dependent upon the magnitude of rotation of the baffle members, as will be understood.

If desired, additional power means may be provided to increase the horizontal speed of the aircraft. In the modification illustrated in FIG. 6 such means is provided by the aircraft engine 74 of the propeller type. This engine is mounted in a duct 76 in the operator's compartment. The inlet end of the duct is at the bottom wall 78 of the compartment, and the outlet end of the duct is at the rear wall 80 of the compartment. Operation of the propeller draws air inward through the inlet opening and forces it out through the outlet opening, thereby providing a thrust which propels the aircraft toward the left.

A rudder member 82 may be provided at the outlet end of the duct, pivoted on the vertical shaft 84 which is controlled by conventional means. The rudder performs the dual function of providing steerage for the aircraft and of preventing or controlling rotation of the compartment relative to the rotating housing.

Figure 6:
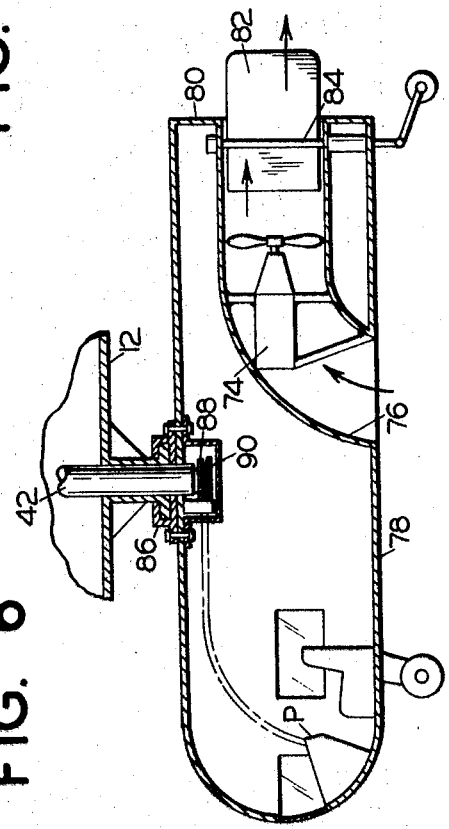
FIG. 6 is a fragmentary sectional view of a modified form of circular wing aircraft embodying the features of this invention.

In the modification illustrated in FIG. 6 the compartment is suspended rotatably from the bottom wall 12 of the housing by means of the thrust bearing coupling 86. The wheel 50 and lever 72 of the first embodiment are replaced by gears 88 and 90, respectively. Each of these gears is operated independently from an operator's control panel P by any suitable remote control device, such as a conventional electric or hydraulic servodrive system.

Referring now to the embodiment illustrated in FIGS. 7-10: A support platform 92 is mounted above the bottom wall 12 of the housing, centrally thereof, on a shaft 94 journaled for rotation on the housing bottom wall. The floor 96 of an operator's compartment is supported above the platform by means of the spacer members 98. The compartment is enclosed by a dome 100 which preferably is transparent.

Upstanding pivot shafts 102 at the outer periphery of the platform are spaced apart circumferentially and each pivotally supports a baffle member 104, in manner similar to the baffle members 54 previously described. The number and size of baffle members preferably correspond to the number and size of passageway inlet ends defined by the vanes 14 in the housing.

Each baffle member 104 is moved between the aforementioned extended and retracted positions by means of a link member 106 connected pivotally at one end to a flange 108 on the baffle member. The opposite end of the link member extends slidably through a guide block 110 secured to the underside of the compartment floor 96. The inner end of the link member rotatably mounts a roller 112 for rolling engagement with the arcuate surface of the operating cam member 114. Projecting downward from the bottom of the cam member is a ball 116 which is received rotatably in the socket member 118 secured to the platform. Projecting upward from the cam member is a control stick 120 by which the operator may manipulate the cam member.

Referring to FIG. 8, the plurality of link members 106 radiate inwardly from the baffle members 104, with their mounted rollers 112 disposed concentrically about the axial center of the housing. The cam member is confined within the circle of rollers. A coil spring 122 interconnects each link member and its guide block and functions to urge the link member radially inward toward the cam member.

Relative rotation between the support platform 92 and housing is provided by the annular rack 124 secured to the bottom wall 12 of the housing concentrically about its center axis. A pinion 126 engaging this rack is secured to the output shaft of an electric or any other variable speed drive motor 128 mounted on the platform. Normally, the motor drives the pinion at a speed matching the rotational speed of the rack, whereby to maintain the platform and operator's compartment stationary. However, the motor speed may be varied to effect turning of the platform and compartment in either direction, as desired.

Horizontal movement and steerage of the aircraft, in manner similar to the embodiment first described, is achieved by manipulating the cam member 114 on its universal mounting to effect outward movement of appropriate ones of the link members 106, against the resistance of the retracting springs 122, to effect closure of appropriate ones of the baffle members 104.

The speed of horizontal flight may be enhanced by the provision of the additional aircraft engine 130, illustrated as being of the jet type, mounted on the projecting end of the rotary support shaft 94 of the platform.

It will be apparent to those skilled in the art that various changes in the size, shape, number and arrangement of parts described hereinbefore may be made without departing from the spirit of this invention.

I claim:

1. A circular wing aircraft, comprising:
 a. a hollow circular housing having a central air inlet opening at its top and a peripheral air outlet opening about its outer periphery;
 b. air flow generating means on the housing operable to effect movement of air through said inlet opening to said outlet opening;
 c. a circular airfoil wing member secured to the housing concentric therewith for passage of said air outward over the upper and lower surfaces of said wing member;
 d. a plurality of circumferentially spaced vane members secured in the housing between said inlet opening and wing member forming a plurality of circumferentially spaced air passageways;
 e. baffle means associated with at least one of the passageways and movable between an extended position closing said passageway and a retracted position opening and passageway; and
 f. baffle support means mounted for rotation relative to the housing for rotating the baffle means about an axis parallel to the housing axis relative to the passageways.

2. A circular wing aircraft, comprising:
 a. a hollow circular housing having a central air inlet opening at its top and a peripheral air outlet opening about its periphery;
 b. air flow generating means on the housing operable to effect movement of air through said inlet opening to said outlet opening;
 c. a circular airfoil wing member secured to the housing concentric therewith for passage of said air outward over the upper and lower surfaces of said wing member;
 d. a plurality of circumferentially spaced vane members secured in the housing between said inlet opening and wing member forming a plurality of circumferentially spaced air passageways;
 e. operator support means mounted on the housing for rotation relative thereto; and
 f. baffle means mounted on the support means for rotation relative thereto about an axis parallel to the housing axis and positioned adjacent the inlet end of the passageways for movement between an extended position closing at least one passageway at a time during rotation of the housing and a retracted position opening said passageway.

3. The circular wing aircraft of claim 2 wherein the support means includes an operator's compartment, and operator means in the compartment engages the baffle means for rotating the latter.

4. The circular wing aircraft of claim 2 wherein the support means includes an operator's compartment, and operator means in the compartment engages the baffle means for moving the latter between said extended and retracted positions.

5. A circular wing aircraft, comprising:
 a. a hollow circular housing having a central air inlet opening at its top and a peripheral air outlet opening about its outer periphery;
 b. air flow generating means on the housing operable to effect movement of air through said inlet opening to said outlet opening;
 c. a circular airfoil wing member secured to the housing concentric therewith for passage of said air outward over the upper and lower surfaces of said wing member;
 d. a plurality of circumferentially spaced vane members secured in the housing between said inlet opening and wing member forming a plurality of circumferentially spaced air passageways;
 e. operator support means mounted on the housing for rotation relative thereto; and
 f. a plurality of baffle means mounted movably on the support means adjacent the inlet end of the passageways, each baffle means being movable between an extended position closing at least one passageway at a time during rotation of the housing and a retracted position opening said passageway.

6. The circular wing aircraft of claim 5 including operator means engaging the baffle means for moving each baffle means selectively between said extended and retracted positions.